United States Patent
Sugino et al.

(10) Patent No.: US 7,997,627 B2
(45) Date of Patent: Aug. 16, 2011

(54) THREADED JOINT FOR STEEL PIPES

(75) Inventors: Masaaki Sugino, Nishinomiya (JP);
Miyuki Yamamoto, Izumiotsu (JP);
Michihiko Iwamoto, Wakayama (JP);
Shigeo Nagasaku, Nishinomiya (JP);
Pierre Dutilleul, Jeanlain (FR); Gabriel Roussie, Cappelle en Pevele (FR); Eric Verger, Gommegnies (FR)

(73) Assignees: Sumitomo Metal Industries, Ltd., Osaka (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 11/117,286

(22) Filed: Apr. 29, 2005

(65) Prior Publication Data

US 2005/0248153 A1 Nov. 10, 2005

Related U.S. Application Data

(63) Continuation of application No. PCT/JP2004/008146, filed on Jun. 4, 2004.

(30) Foreign Application Priority Data

Jun. 6, 2003 (JP) .................................. 2003-162699

(51) Int. Cl.
*F16L 25/00* (2006.01)
(52) U.S. Cl. ....................................... 285/333; 285/390
(58) Field of Classification Search .................. 285/333, 285/390, 355, 40, 39, 148.19
See application file for complete search history.

(56) References Cited

U.S. PATENT DOCUMENTS

| | | | | |
|---|---|---|---|---|
| 3,870,351 A | * | 3/1975 | Matsuki | 285/334 |
| 4,377,302 A | * | 3/1983 | Kohyama et al. | 285/334 |
| 4,433,862 A | * | 2/1984 | Raulins et al. | 285/350 |
| 4,548,431 A | | 10/1985 | Hall et al. | |
| 4,623,173 A | * | 11/1986 | Handa et al. | 285/333 |
| 4,624,488 A | | 11/1986 | Furgerson | |
| 4,795,200 A | | 1/1989 | Tung | |
| 5,419,595 A | | 5/1995 | Yamamoto et al. | |
| 5,829,797 A | | 11/1998 | Yamamoto et al. | |
| 6,557,906 B1 | * | 5/2003 | Carcagno | 285/333 |
| 7,014,212 B2 | * | 3/2006 | Mallis | 285/333 |
| 2002/0017788 A1 | * | 2/2002 | Krug et al. | 285/333 |
| 2004/0262919 A1 | * | 12/2004 | Dutilleul et al. | 285/333 |

FOREIGN PATENT DOCUMENTS

| | | |
|---|---|---|
| CN | 2366656 Y | 3/2000 |
| GB | 1 220 856 | 1/1971 |
| GB | 2074685 A * | 11/1981 |
| JP | 58-157087 | 10/1983 |
| JP | 08-247351 | 9/1996 |
| WO | WO 03/048623 A1 | 6/2003 |

* cited by examiner

Primary Examiner — Aaron Dunwoody
(74) Attorney, Agent, or Firm — Clark & Brody (57) ABSTRACT

A threaded joint for steel pipes comprises a pin (1) and a box (2). The pin has male thread (11), a sealing surface (13), and a shoulder surface (14) located on the end face of the pin. Correspondingly, the box has female thread (21), a sealing surface (23), and a shoulder surface (24) which can mate or contact with the corresponding portions of the pin. The shoulder surface (14) of the pin (1) is provided at an end face of the pin. The sealing surface (13) of the pin (1) is located on a pipe end side near the male thread (11). A a nose portion (15) is provided on the pin (1) between the sealing surface (13) and the shoulder surface (14), the nose portion (15) being not in contact with a corresponding portion of the box (2).

21 Claims, 8 Drawing Sheets

THREADED JOINT FOR STEEL PIPES

This application is a continuation of International Patent Application No. PCT/JP2004/008146, filed Jun. 4, 2004.

TECHNICAL FIELD

The present invention relates generally to a threaded joint for use in connecting steel pipes such as oil well pipes or OCTG (oil country tubular goods) including tubing and casing, riser pipes, and line pipes for use in exploration and production of oil wells and gas wells, and particularly to a threaded joint for steel pipes having excellent sealability with respect to external pressure and resistance to compression.

BACKGROUND ART

Threaded joints are widely used for connecting steel pipes, such as OCTG and riser pipes for use in industrial oil production equipment.

In the past, standard threaded joints specified by API (American Petroleum Institute) standards have typically been used to connect steel pipes for use exploration and production of oil and gas. However, in recent years, the environments in which exploration and production of crude oil and natural gas take place have been becoming increasingly severe, so special high-performance threaded joints referred to as premium joints are being increasingly used.

A premium joint usually comprises, on each pipe, a tapered thread, a metal-to-metal seal portion, i.e., a sealing surface having the ability to form a seal when in intimate contact with the metal-to-metal seal of the other member of the joint, and a torque shoulder portion, i.e., a shoulder surface which functions as a stopper during make-up of the joint.

In the past, since vertical wells were most common, a threaded joint for OCTG could function adequately as long as it could withstand a tensile load due to the weight of the pipes attached to it and could prevent leakage of a high-pressure fluid passing through its interior. In recent years, however, because wells are becoming deeper, because the number of directional wells and horizontal wells having a curved well bore has been increasing, and because the development of wells in severe environments such as offshore or in higher latitudes has been increasing, a wider variety of properties are required of threaded joints, such as resistance to compression, resistance to bending, sealability against external pressure, and ease of handling in the field.

Figure 2A:
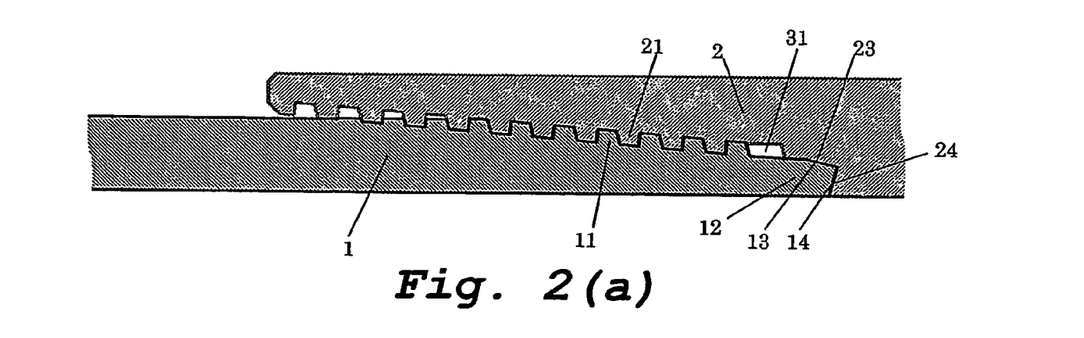
FIG. 2(a) is an enlarged view of a portion of FIG. 2(b)
Figure 2B:
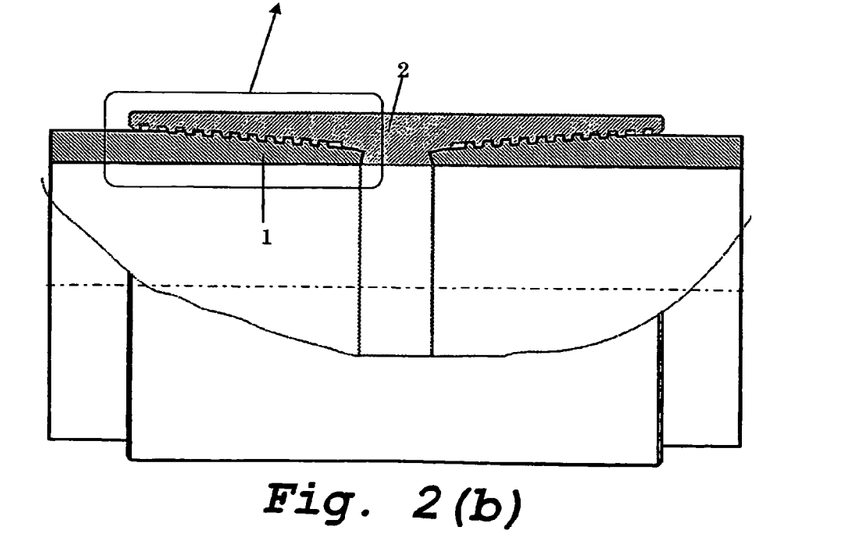
FIG. 2(b) is a cutaway overall view.

FIGS. 2(a) and 2(b) are schematic explanatory views of an ordinary coupling-type premium joint for OCTG, which comprises an externally-threaded member 1 (referred to below as a pin member, or simply as a pin) and a corresponding internally threaded member 2 (referred to below as a box member, or simply as a box).

The pin member 1 has, on its outer surface, a male thread 11 and an unthreaded portion 12 called a lip which is located at the end of the pin 1 and adjacent to the male thread 11. The lip 12 has a metal-to-metal seal portion 13 on the outer peripheral surface of the lip and a torque shoulder portion 14 on the end face of the lip.

The corresponding box member 2 has, on its inner surface, a female thread 21, a metal-to-metal seal portion 23, and a torque shoulder portion 24 which are portions capable of mating or contacting with the male thread 11, the metal-to-metal seal portion 13, and the torque shoulder portion 14, respectively, of the pin 1.

Figure 3:
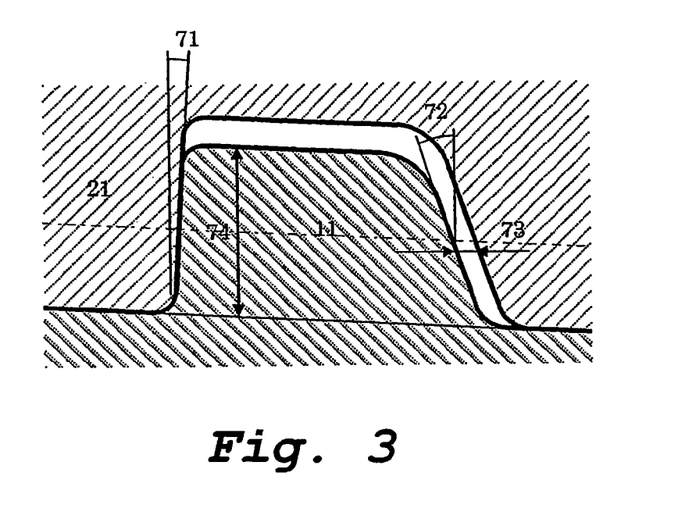
FIG. 3 is a schematic view illustrating the shape and dimensions of a trapezoidal thread exemplified by an API buttress thread.

FIG. 3 is a schematic diagram illustrating the shape and dimensions of a trapezoidal thread, exemplified by an API buttress thread. Most threads for use in premium joints are trapezoidal threads modeled on this API buttress thread. Many threads almost directly copy the dimensions of an API buttress thread with respect to the aspect ratio of the thread teeth, the flank angle, and other features.

In FIG. 3, if the thread is an API buttress thread having a thread pitch of 5 TPI (5 threads per inch), for example, the thread height 74 is 1.575 mm, the load flank angle 71 is 3 degrees, the stabbing flank angle 72 is 10 degrees, and the axial gap 73 between the stabbing flanks is around 100 μm (i.e., 30 to 180 μm) on average.

An overlap in the radial direction called an interference is provided between the sealing surfaces of the pin and the box. When the joint is made up until the shoulder surfaces of the pin and the box abut each other, the sealing surfaces of the two members are brought into intimate contact with each other over the entire circumference of the joint to form a seal.

The shoulder surfaces function as stoppers during make-up, and they also bear almost all of a compressive load applied to the joint. Therefore, they cannot resist a large compressive load unless the wall thickness of the shoulder surfaces is large (or unless the stiffness of the shoulders is high).

When external pressure is applied to a conventional premium joint like that described above, the applied external pressure penetrates through gaps between the threads to a portion 31 shown in FIG. 2 just before the seal portions.

A lip is much thinner in wall thickness than a pipe body, so it can undergo a decrease in radius due to the penetrating external pressure. As the external pressure is increased, a gap forms between the sealing surfaces, resulting in leakage, i.e., a situation in which external fluid enters the inside of a pipe.

If a compressive load is applied to a premium joint in situations such as when OCTG is disposed in a horizontal well or directional well, since most joints have a relatively large gap between the stabbing flanks as is the case with the above-described API buttress thread, the threads have a poor ability to resist compressive loads, so most of a compressive load is borne by the shoulders.

However, the wall thickness (the load bearing area for a compressive load) of a shoulder surface is usually much smaller than that of a pipe body. Therefore, if a compressive load equivalent to 40 to 60% of the yield strength of the pipe body is applied, most premium joints undergo considerable plastic deformation of the torque shoulder portion of the box, resulting in a significant reduction in the sealability of the adjacent sealing surfaces.

The sealability of a joint with respect to external pressure can be improved by increasing the stiffness of the pin to increase its resistance to deformation by radial contraction. For this purpose, a method is often used in which a working process to reduce the diameter of the pipe end called swaging is previously performed to increase the lip wall thickness.

However, if the amount of swaging is too large, in the case of casing, a pipe being inserted into the casing may catch on the swaged portion, and in the case of tubing, the swaged portion may cause turbulence in a fluid such as crude oil flowing inside the tubing and cause erosion. Therefore, the wall thickness of the pin lip wall cannot be increased so much by swaging.

Other conventional techniques for increasing the stiffness of the end of a pin to improve its sealability are described in U.S. Pat. No. 4,624,488 and U.S. Pat. No. 4,795,200. These patents disclose techniques in which sealability is increased by providing a cylindrical portion which does not contact a box at the end of a sealing surface of a pin so as to increase the stiffness with respect to deformation by radial contraction of the periphery of the sealing surface of the pin and to make the sealing surfaces of a joint uniformly contact.

With a pipe joint, even if swaging is performed, it is necessary to provide a tapered thread, a sealing surface, and a shoulder surface within a limited wall thickness. However, in the above-described prior art, the shoulder surface must be disposed in a location other than on the lip because the end of the pin does not abut the box, so the wall thickness of the lip is necessarily reduced.

Thus, there is a limit to the extent to which the stiffness of the lip can be increased so as to resist a decrease in radius caused by external pressure, and the sealability with respect to external pressure cannot be significantly improved. In addition, because the shoulder surface cannot be given a sufficient radial width, a high level of resistance to compression cannot be achieved, and the sealability is poor under a combination of compression and external pressure.

Techniques for giving a thread the capability of bearing a compressive load in order to improve resistance to compression are described in U.S. Pat. No. 5,829,797 and U.S. Pat. No. 5,419,595, for example. U.S. Pat. No. 5,829,797 describes threads in which the load flanks and the stabbing flanks of trapezoidal threads contact each other, and radial gaps are provided at both the thread roots and thread crests. This thread has a very high ability to bear a compressive load because the stabbing flanks are always in contact.

U.S. Pat. No. 5,419,595 describes a thread in which the gap between the stabbing flanks of trapezoidal threads is reduced to 30 μm or less so that the stabbing flanks are brought into contact with each other only when a compressive load is applied. Although the ability of this thread to bear a compressive load is less than that of the thread described in U.S. Pat. No. 5,829,797, it is much higher than that of an ordinary buttress thread.

However, with the thread disclosed in U.S. Pat. No. 5,829,797, if the width of the thread teeth varies, large variations can occur in resistance to compression, anti-galling properties, make-up torque, and other properties. Therefore, it is necessary to make manufacturing tolerances extremely small, and as a result, this thread has the problem that it is unsuitable for mass production and is extremely expensive to manufacture.

U.S. Pat. No. 5,419,595 has a similar problem. Namely, the gap between the stabbing flanks must be set to a value of 0 to 30 μm. In this case, allowable variations in the width of the male thread teeth and the female thread teeth are each only ±7.5 μm, so the thread cutting becomes extremely expensive and unsuitable for mass production.

DISCLOSURE OF THE INVENTION

The object of the present invention is to solve the problems of the above-described prior art and provide a threaded joint for steel pipes which has excellent resistance to compression and greatly improved overall sealability with respect to external pressure not only when subjected to external pressure alone but also when subjected to a combined load of compression and external pressure or tension and external pressure.

Figure 4:
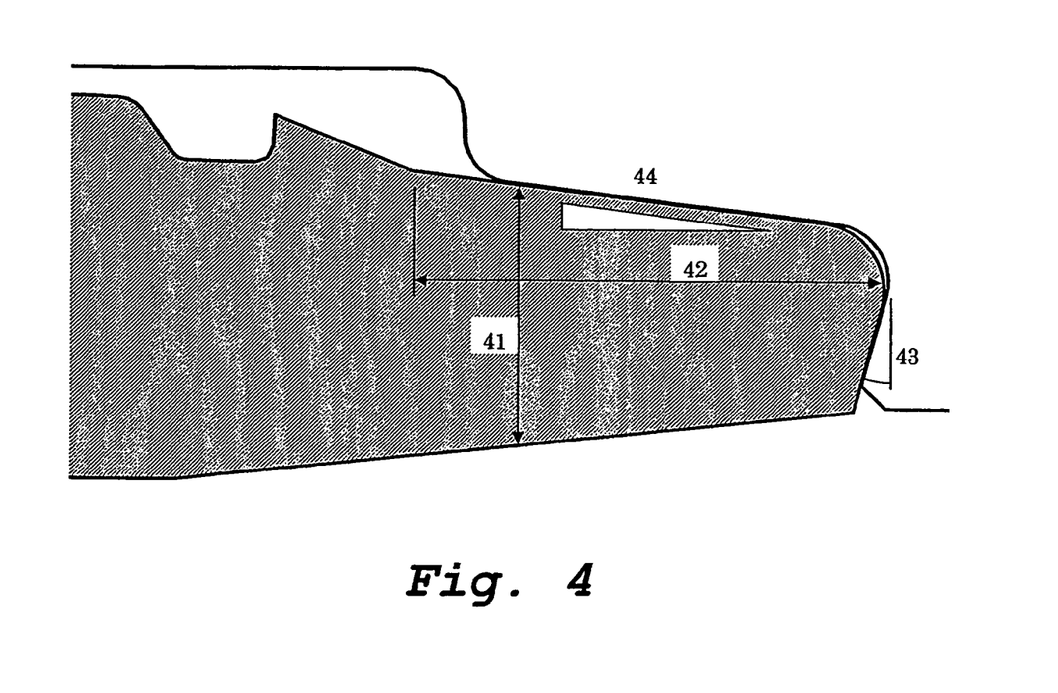
FIG. 4 is a schematic explanatory view of the factors determining the shape of a lip used in basic studies in connection with the present invention.

FIG. 4 is a schematic illustration of a lip used in basic studies performed in connection with the present invention.

In order to achieve the above-described object, the present inventors performed finite element analysis with respect to the following four design factors for determining the shape of a lip of a premium joint having the above-described structure: (1) the lip thickness 41, (2) the lip length 42, (3) the shoulder angle 43, and (4) the seal taper (taper of the sealing surface) 44. For each factor, they investigated its effect on sealability with respect to external pressure.

As a result, it was found that the lip thickness 41 and the lip length 42 have the greatest effect on the sealability with respect to external pressure, and that the thicker the lip thickness and the longer the lip length, the more markedly is the sealability with respect to external pressure improved.

It was found that in order to improve resistance to compression, the lip thickness is preferably increased as much as possible. As for the shoulder angle 43, the sealability under a combined load of compression and external pressure is improved if the shoulder angle of a pin is such that an outside portion of the shoulder of a pin is tapered to form a hook shaped shoulder surface as depicted (such an angle being referred to below as a hook angle). However, such a shoulder angle results in increased damage to the shoulder surface of a box member by a compressive load. Therefore, if a shoulder angle is provided, the shoulder surface of the box member is preferably reinforced, or a thread having a high capability of bearing a compressive load is preferably used.

It was found that the seal taper 44 has only a small effect on the sealability with respect to external pressure. However, if the seal taper is too large, the contact pressure on the seal (sealing pressure) is markedly reduced when tension is applied, and if the seal taper is too small, galling occurs on the sealing surfaces due to an increase in sliding distance during make-up and break-out.

Based on the above results, the present inventors realized that if both the lip thickness and lip length are increased (lengthened) as much as possible, the sealability with respect to external pressure can be considerably improved, and that resistance to compression can be improved at the same time.

With respect to threads, application of the conventional techniques of U.S. Pat. Nos. 5,829,797 and 5,419,595 to the thread shape is best if only resistance to compression is taken into account. However, these conventional techniques have the above-described problems and are not suitable for mass production.

The present inventors realized that since resistance to compression by the shoulder itself can be considerably improved by the above-described lip shape having an increased lip thickness, even if ultra-high performance threads that are not easily produced are not employed, resistance to compression of an overall joint can be significantly improved by employing high-performance threads that are easily produced.

Based on this idea, the present inventors performed embodiment research concerning the finding that the longer the lip length, the better the sealability with respect to external pressure. As a result, it was found that the sealing surfaces of the pin and the box are in contact only on the root side thereof (the side closer to the threads), while an increase in the volume of the remaining noncontacting portion of the lip from the end of the contact portion to the tip of the lip serves to increase the stiffness of the lip against external pressure.

In the embodiment of FIG. 4, even if the lip length is increased, since the noncontacting portion of the lip from the end of the sealing surface to the tip of the lip is tapered, increasing the lip length does not significantly increase the volume of the noncontacting portion of the lip, and undesirably it results a decrease in the area of the shoulder surface, thereby decreasing the capability of the shoulder portion to bear a compressive load. Therefore, the lip shape was changed to that shown in FIG. 1.

Figure 1:
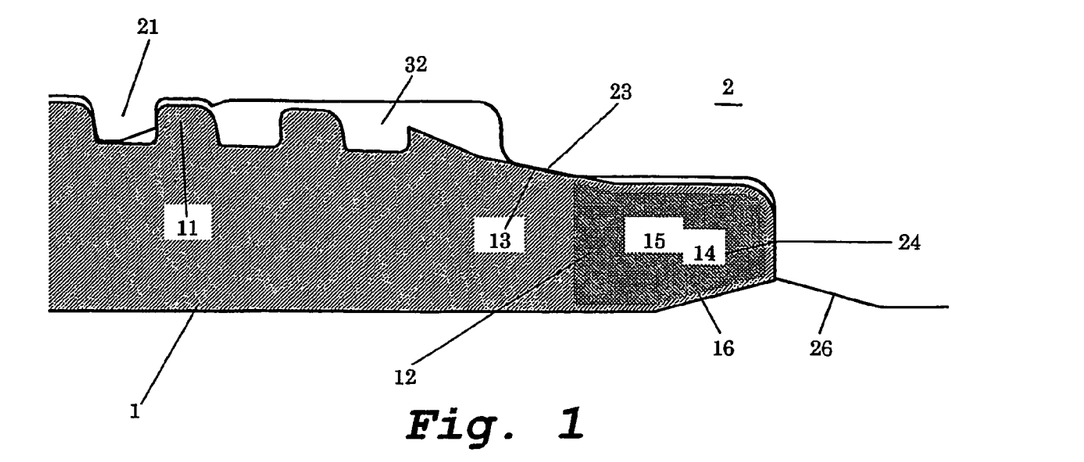
FIG. 1 is a schematic diagram illustrating the shapes of a lip and the periphery of the lip of a threaded joint for steel pipes according to the present invention.

In FIG. 1, in order to increase the wall thickness of the shoulder surface as much as possible and increase the volume of the noncontacting portion of the lip from the sealing surface to the end of the lip as much as possible, a portion 15

(referred to below as a nose portion) of a lip 12 between a seal portion 13 and a shoulder portion 13 of a pin member 1 is made almost cylindrical, and the outer surface of the nose portion 15 is made so as not to contact a box member 2.

By giving the lip such a shape, the wall thickness of the shoulder surface and the wall thickness of the sealing surface are successfully increased as much as possible within a limited wall thickness of the pipe. However, due to manufacturing errors, the cross section of the pipe is not a perfect circle but has wall thickness variations or ovalness. Therefore, a chamfer 16 may be formed on the inner edge of the end portion of the pin by an amount corresponding to the manufacturing tolerance of the pipe in order to ensure that the inner edge of the end of the pin will not protrude beyond a perfect circle of a predetermined diameter centered on the joint axis. In such a case, the inner edge of the box 2 may also have a corresponding chamfer 26 as described later.

On the pin, if the thread is provided as close as possible to the sealing surface, the stiffness of the lip of the pin against external pressure is further increased, and therefore the sealability with respect to external pressure is also increased.

This concept is quite different from that of the prior art described in U.S. Pat. No. 4,624,488 and U.S. Pat. No. 4,795,200 in that the end of the pin is used as a shoulder surface, and therefore the thickness of the lip can be greatly increased compared to the prior art in which the shoulder surface is in a different location.

In addition, because the wall thickness of the nose portion can be increased as much as possible, the sealability with respect to external pressure can be greatly increased just by slightly increasing the axial length of the nose portion (referred to below as the nose length).

Furthermore, the shoulder surface can be enlarged, and the shoulder portion can achieve its maximum capability of bearing a compressive load. Consequently, if the capability of bearing a compressive load is somewhat greater than that of a buttress thread, the resistance to compression of the threaded joint can be considerably improved by employing the lip having the nose portion.

BRIEF DESCRIPTION OF THE DRAWINGS

FIGS. 2(a) and 2(b) are schematic explanatory views of an ordinary coupling-type premium joint for OCTG, in which

DESCRIPTION OF PREFERRED EMBODIMENTS

The present invention will now be described in greater detail with reference to the figures and with respect to preferred embodiments. In the figures, the same members or portions of a joint have the same reference numbers.

Figure 5:
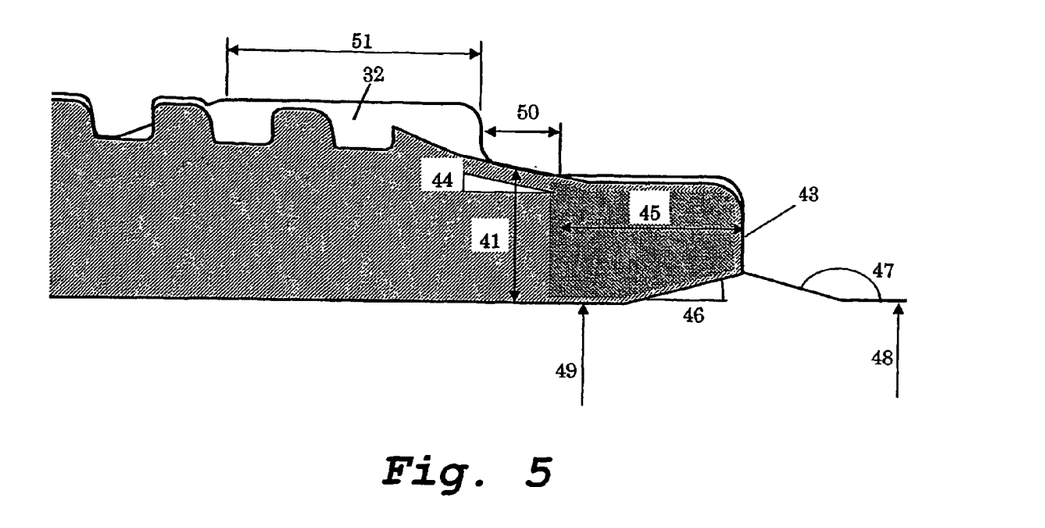
FIG. 5 is a schematic explanatory view of factors defining the shapes of the lip and the periphery of the lip of a threaded joint for steel pipes according to the present invention.

FIGS. 1 and 5 are schematic explanatory views of a threaded joint for steel pipes according to the present invention, which comprises a pin member 1 and a box member 2 connected to each other by threaded engagement. The pin member 1 has a male thread 11, at least one sealing surface 13, and at least one shoulder surface 14 formed on the end portion of a pipe. The box member 2 has a female thread 21, at least one sealing surface 23, and at least one shoulder surface 24 corresponding to (capable of mating or contacting with) the male thread 11, the sealing surface 13, and the shoulder surface 14, respectively, of the pin member 1 formed on the end of a pipe. This joint is one type of premium joint.

In such a threaded joint for steel pipes, make-up is completed when the shoulder surface 14 on the end face of the pin member 1 abuts against the corresponding shoulder surface 24 of the box member 2.

According to the present invention, the pin member has a nose portion 15 which does not contact the corresponding portion of the box member 2 (i.e., the portion of the box 2 facing the nose portion 15 of the pin 1). The nose portion 15 is located between the sealing surface 13 (which is located on the outer periphery of the pin member closer to the end of the pin member than the male thread of the pin member) and the shoulder surface 14 (which is located on the end face of the pin member). As a result, since the length of lip 12 is increased without a decrease in the shoulder surface 14, the sealability of the joint against external pressure can be significantly improved. In addition, by providing the male thread 11 in the vicinity (and preferably in the immediate vicinity) of the sealing surface 13 of the pin 1, the stiffness of the lip 12 against reductions in diameter is increased, and the sealability against external pressure is further increased.

Referring to FIG. 5, in a preferred embodiment of the present invention, it has been found that a threaded joint for steel pipes having the configuration described above can be improved by specifying its shape and dimensions.

Namely, the present inventors conducted studies on the ranges of dimensions and shapes of each portion for more efficiently obtaining the above-described effects of the present invention.

For a usual premium joint, resistance to compression equivalent to about 20% of the yield strength of the pipe body is required, but some wells require resistance to compression equivalent to more than 60% of the yield strength.

A compressive load is applied not only to the shoulder portion but also to the thread. If a thread having a high capability of bearing a compressive load is employed, the load on the shoulder portion can be correspondingly reduced. However, if the lip thickness 41 (the wall thickness of the pin at the center of the seal contact region 50) has a lip thickness ratio (ratio of the lip thickness to the wall thickness of the pipe body) of at least 25% and preferably at least 50%, a sufficient resistance to compression can be obtained by the lip alone (without the use of a thread having a high capability of bearing a compressive load).

The upper limit of the lip thickness ratio can be increased to about 85% (of the wall thickness of the pipe body), if the below-described swaging is performed.

Since the sealability with respect to external pressure improves as the thicknesses of the seal portion and the nose portion of the lip are increased, the angle 46 of the chamfer 16 provided on the inner surface of the end of the lip is preferably 9 to 76 degrees relative to the joint axis.

However, an abrupt change in the pipe inner diameter can cause turbulence and erosion, so the inner diameter 48 of the box is set to be almost equal to the inner diameter 49 of the pin lip, and a chamfer 26 having a chamfer angle 47 and a shape similar to that of the pin is provided on the inner periphery of the shoulder surface of the box. Thus, the chamfer angle of the box portion is preferably in the range of 104 to 171 degrees for the same reasons given with respect to the pin chamfer.

In this way, the change in the diameter of the joint is minimized, so occurrence of turbulence can be prevented, and at the same time, the shoulder portion of the box is reinforced. Therefore, the extent of a compressive load capable of being borne by the shoulder portions is increased to improve the resistance to compression of the joint.

The nose length 45 depends on the size of the pipe, but it is approximately 4 mm to 20 mm for the size of the pipes used as OCTG (which has an outer diameter of about 50 to 550 mm).

As stated earlier, the longer the nose length the better, but the effect on improving sealability saturates when the nose length reaches a certain level, so a maximum nose length of 20 mm is adequate for an actual product.

Figure 14:
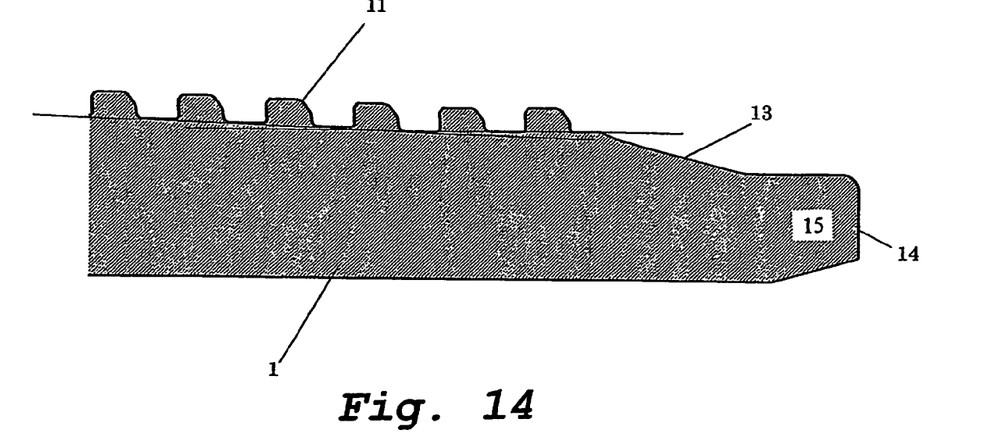
FIG. 14 is a schematic diagram illustrating another embodiment in which the male thread comprises a run-in portion where the envelope of the male thread roots has a reduced taper compared to that of the thread taper.

Preferably when the male and female threads are tapered threads, the male thread comprises, on the sealing surface side of the thread, a run-in portion which is formed first during thread cutting to make the male thread. In this run-in portion, the envelope of the male thread roots has a reduced taper compared to that of the thread taper (see FIG. 14). Such a reduced taper of the envelope of the thread roots in the run-in portion induces several benefits: ease of machining of the sealing surface of the pin without scratches and an increase in stiffness of the lip, thus in tightness to external pressure. Preferably, as described later, the run-in portion of the male thread does not engage with female threads. Most preferably the envelope of the male thread roots in the run-in portion is a cylindrical surface.

The shape of the sealing surface of pin or box may be:
(i) a tapered surface resulting from rotation around the joint axis of a straight line inclined relative to the axis, or
(ii) a bulged surface resulting from rotation around the joint axis of a curve, and more particularly torical surface if the curve is a circular arc, or
(iii) a torico-conical surface resulting from rotation around the joint axis of a combined line of the inclined straight line and the circular arc.

Figure 15:
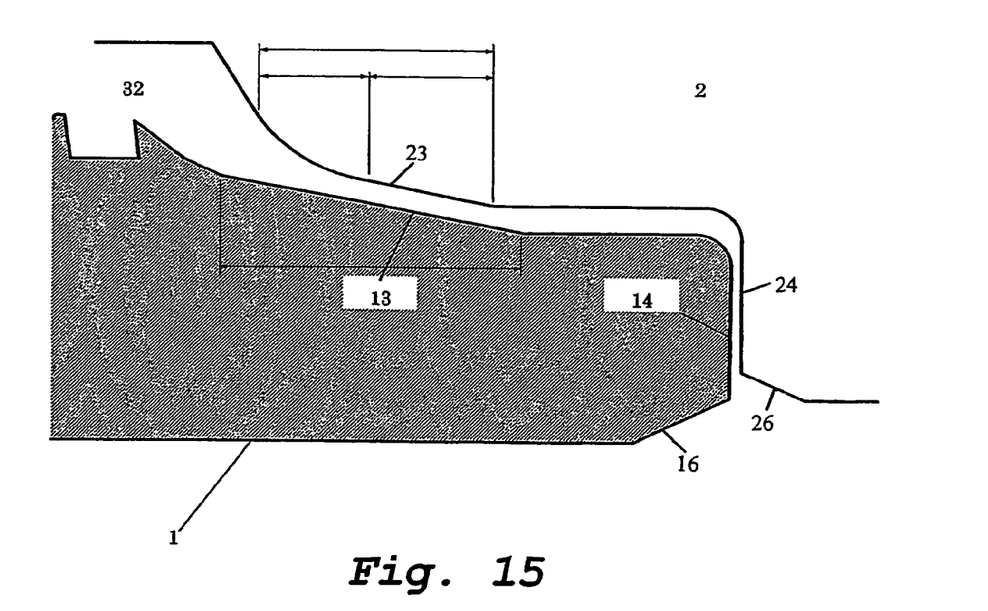
FIG. 15 is a schematic diagram of another embodiment which has a torico-conical sealing surface on the box cooperating with a tapered surface on the pin.

Preferably the sealing surface of one of the pin and the box (for instance, that of the pin) is a tapered surface, while the sealing surface of the other member (for instance, that of the box) is either a torical surface or a torico-conical surface, the tapered portion of the torico-conical sealing surface being on the nose side and having substantially the same taper as the tapered sealing surface (see FIG. 15).

Figure 12:
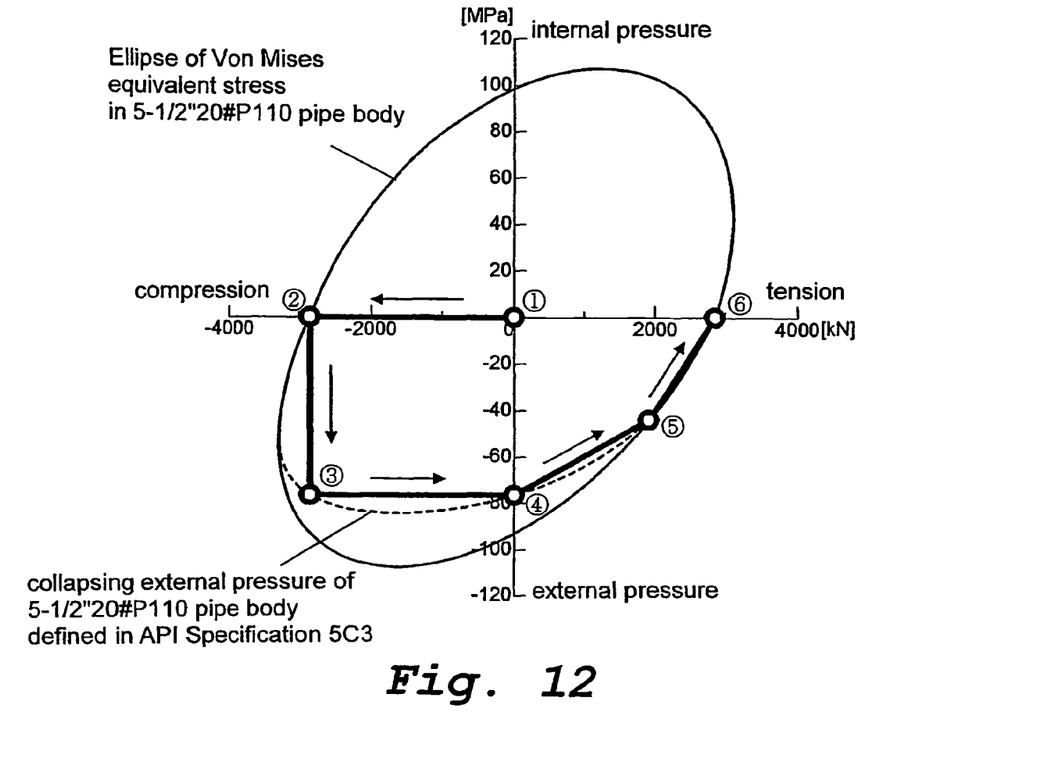
FIG. 12 is a schematic diagram illustrating the sequence in which a load is applied to a specimen during FEM analysis of examples.

The cooperation of a tapered sealing surface and a torico-conical sealing surface has shown an excellent stability of the contact pressure (and thus of the tightness) for the various service conditions, for example resulting from a load cycle such as that of FIG. 12.

For bulged, torical or torical portion of torico-conical sealing surfaces, the radius of curvature of the surface is preferably larger than 20 mm, and more preferably larger than 40 mm.

For the reasons stated above, the angle of the sealing surface with respect to the joint axis, i.e., the seal taper 44 is preferably 5 to 25 degrees and more preferably 10 to 20 degrees.

The existence of a seal taper involves on the pin a discontinuity of surface between the sealing surface and the outer surface of the nose.

The sealing surface requires a region of substantial contact having an axial length of at least about 1 to 1.5 mm in order to guarantee sealing properties. However, if the sealing surface is too long, a sufficient wall thickness of the torque shoulder portion cannot be obtained, and the cost required for finishing the sealing surface increases, resulting in a reduction in productivity.

Therefore, the axial length 50 of the region of the sealing surface where there is substantial contact is 2 to 8 mm and preferably 3 to 5 mm.

Figure 6:
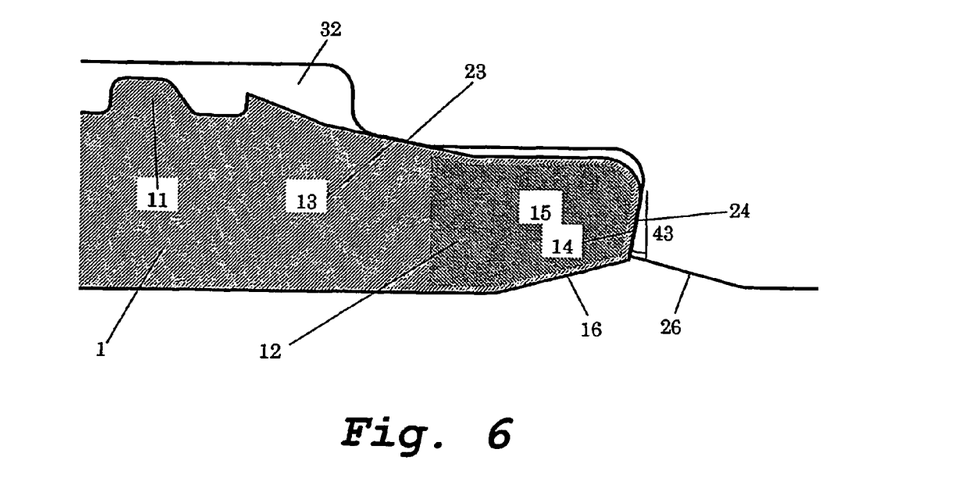
FIG. 6 is a schematic explanatory view of the shapes of the lip and the periphery of the lip of a threaded joint for steel pipes according to the present invention in which a shoulder surface is angled.

The shoulder surface may be substantially perpendicular to the joint axis as shown in FIG. 5. However, according to the above-described investigations, the sealability when a compressive load is applied is improved if a hook angle is provided as shown in FIG. 6, although if the hook angle is too large, the stiffness of the shoulder surface of the box is reduced, resulting in a decreased resistance to compression. Therefore, if a shoulder angle 43 is provided, it is preferably 4 to 16 degrees with respect to a plane perpendicular to the joint axis.

FIG. 6 is a schematic explanatory view of the shape of the lip and the periphery of the lip when a hook angle is provided on the shoulder surface of a threaded joint for steel pipes according to the present invention.

In these embodiments the pin shoulder is a single surface extending without discontinuity between an outer surface and an inner surface of the nose.

Interferences are present between the sealing surfaces and between the threads of the pin and the box. If the sealing surfaces are too close to the threadingly engaged portions of the threads, the extent of substantial interference between the sealing surfaces is undesirably reduced due to the interference between the threads.

However, as far as the pin is concerned, as described earlier, the presence of additional thread in the portion between the thread and the sealing surface is desirable in order to increase the stiffness of the pin against external pressure.

Thus, the structure of the pin is preferably such that the male thread extends so as to be as close as possible to the sealing surface. For this purpose, the sealing surface is preferably spaced from the male thread by a distance equal to at most one pitch of the thread to increase the stiffness of the lip. At the same time, a circumferential groove 32 is provided in the box to prevent the portions of the threads near the sealing surfaces of the pin and the box from engaging with each other. If a run-in portion is provided on the male thread, the run-in portion of the male thread corresponds to the just-mentioned portion of the male thread which is prevented from engaging with the female thread by the groove 32.

If the axial length 51 of the circumferential groove 32 is small, the substantial interference between the sealing surfaces is reduced due to the thread interference. On the other hand, if the axial length 51 of the groove 32 is too large, the sealability is reduced, and manufacturing costs are unnecessarily increased. A preferred range for the length 51 of the groove 32 is 1.5 to 3.5 times the thread pitch.

Figure 7A:
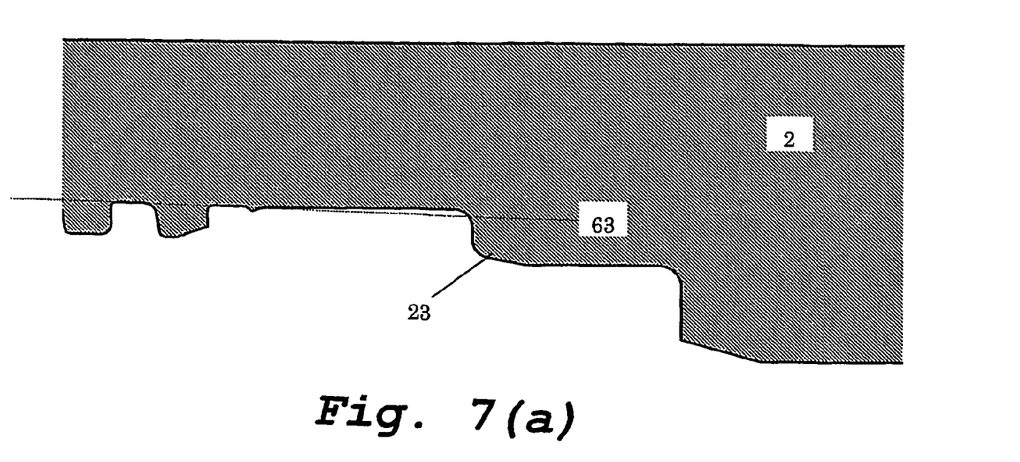
FIG. 7(a) is a schematic explanatory view showing the positional relationship between the inner diameter of a box groove and a line extending from the root of a female thread.
Figure 7B:
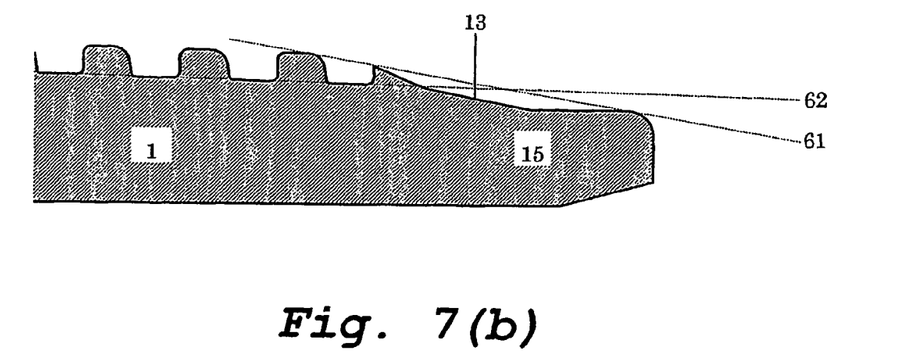
FIG. 7(b) is a schematic explanatory view showing the positional relationship between a sealing surface of a pin and a line extending from the root of a male thread or a tangent to the male thread and the nose portion.

FIG. 7(a) is a schematic explanatory view showing the positional relationship between the inner diameter of the groove of the box and a line 63 extending along the root of the female thread, and FIG. 7(b) is a schematic explanatory view showing the positional relationship between the sealing surface of the pin and a line 62 extending along the root of the male thread or a tangent 61 to the male thread and the nose portion.

As shown in FIG. 7(a), the inner diameter of the circumferential groove of the box is preferably such that the inner surface of the groove is disposed radially outwards of the extension line 63 of the root of the female thread with respect to the axis of the box. However, if the inner diameter of the groove is excessively increased, the outer diameter of the box also disadvantageously increases. Therefore, the inner diameter of the groove should be larger than the radial distance from the axis of the box to the extension line 63 of the root of the female thread only to the extent that manufacturing can easily be performed.

As shown in FIG. 7(b), the positional relationship between the thread, the sealing surface, and the nose portion (the outer surface) of the pin is such that the sealing surface is disposed radially inwards (as measured from the axis of the pin) of both the tangent 61 to the crest of the male thread and the tip of the pin (the nose portion) or the extension line 62 of the root of the male thread.

By employing such an arrangement, it becomes difficult for the sealing surface to be damaged even if the end of the pin strikes against something during operation in the field, and a reduction in sealability can be prevented.

The gap between the stabbing flanks and the stabbing flank angle significantly influence the resistance to compression of the threads. As described previously, the gap between the stabbing flanks is 30 μm to 180 μm for an API buttress thread. Assuming that the rate of occurrence of manufacturing errors for an API buttress thread has a normal distribution, products having a gap between stabbing flanks of about 100 μm will be most numerous. However, such a gap size does not produce a particularly high resistance to compression.

By conducting investigations based mainly on the finite element method, the present inventors found that a high resistance to compression is obtained if the gap between the stabbing flanks is at most 90 μm.

However, if the stabbing gap is too small, the pressure (referred to as the dope pressure) of a lubricant referred to as dope which is coated on the threads during make up may rise to an abnormal level and adversely affect the performance of the joint. In addition, if the stabbing flanks contact each other as described in the above-described U.S. Pat. No. 5,829,797, galling or variations in make-up torque may occur.

Thus, the effects of the present invention can be obtained by setting the gap between stabbing flanks to be in the range of from 10 μm to 150 μm in view of the normal distribution of manufacturing errors. Preferably, the gap between stabbing flanks is from 20 to 90 μm in order to obtain further improved effects.

The ability of threads to bear a compressive load increases as the stabbing flank angle decreases. Conversely, as the stabbing flank angle increases, the male thread and the female thread slide along a slope, and the ability of the threads to withstand a compressive load is reduced. The upper limit on the stabbing flank angle such that the capability to withstand a compressive load is not severely reduced is approximately 36 degrees.

On the other hand, if the stabbing flank angle is too small, damage due to wear of a thread cutting tool becomes severe, and it becomes very difficult to maintain manufacturing tolerances. Therefore, the lower limit is set to 3 degrees.

In the preceding description, an embodiment of the present invention was described in which a sealing surface and a shoulder surface are provided on the lip at the end of a pin, but embodiments other than that described above are possible for steel pipes for special applications.

Figure 8:
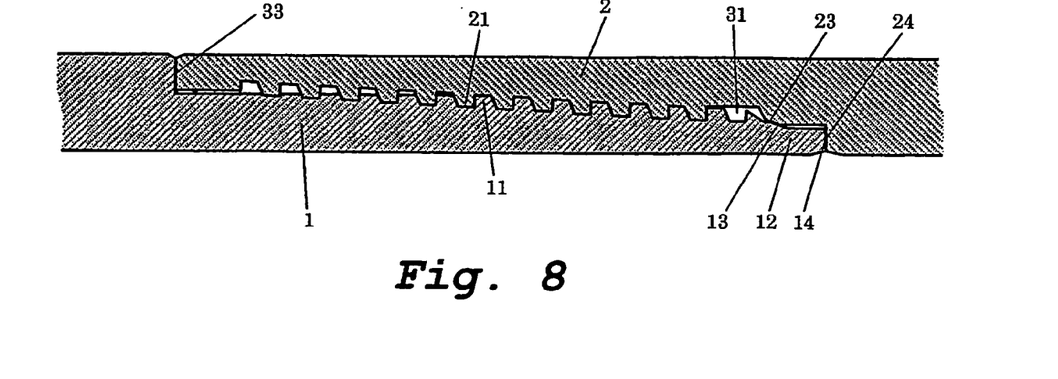
FIG. 8 is a schematic diagram illustrating another embodiment of the present invention in which a second shoulder is provided on an end face of a box.
Figure 9:
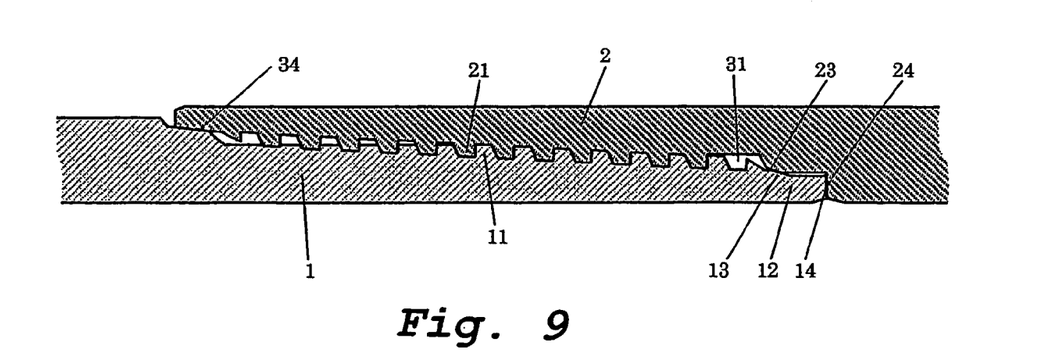
FIG. 9 is a schematic diagram illustrating another embodiment of the present invention in which a second seal is provided at the end of a box.

For example, as shown in FIGS. 8 and 9, when the present invention is applied to a drill pipe with an upset end or an OCTG with an extremely large wall thickness, an embodiment is possible in which a second series of shoulder surfaces 33 and/or a second series of sealing surfaces 34 are provided with the pin 1 and the box 2 in combination with the structure of the pin lip 12 having the nose portion according to the present invention.

FIG. 8 is a schematic diagram illustrating an embodiment of the present invention having a second series of shoulder surfaces of the pin and the box on the end face of the box.

FIG. 9 is a schematic diagram illustrating an embodiment of the present invention having a second series of sealing surfaces of the pin and the box at the end of the box.

Figure 10:
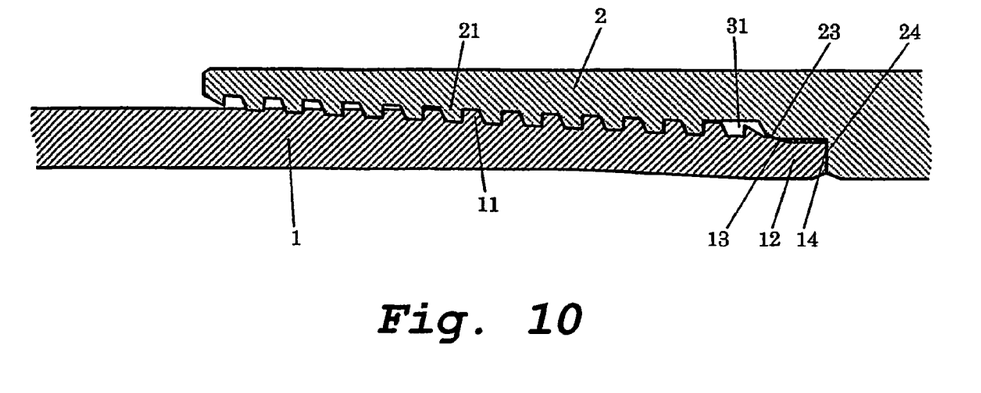
FIG. 10 is a schematic diagram showing one example of an embodiment of the present invention in which a joint of the present invention is provided on a pin member, the end of which has been subjected to swaging.

FIG. 10 is a schematic diagram showing one example of an embodiment of the present invention in which the joint of the present invention is provided on a pin member having an end which has been subjected to swaging to reduce both the pipe diameter at the end and increase the wall thickness of the pin lip.

The present invention provides sufficient sealability even if the end of the pin is not subjected to swaging. However, if it is desired to obtain a very high level of resistance to torsion or resistance to compression, for example, the wall thickness of the shoulder surface can be increased by forming the threaded joint of the present invention on the end of a pin which has previously been subjected to swaging (see FIG. 10). In this case, however, the change in the inner diameter of the joint should be suitably selected so that turbulence will not occur.

Embodiments of the present invention have been described using a coupling-type joint as shown in FIG. 2 as an example. However, as shown in FIG. 11, the present invention as described above can be applied to an integral joint (one in which pipes are directly connected to each other without using a coupling but instead by providing a pin on one end of a pipe body and providing a box on the other end).

Figure 11:
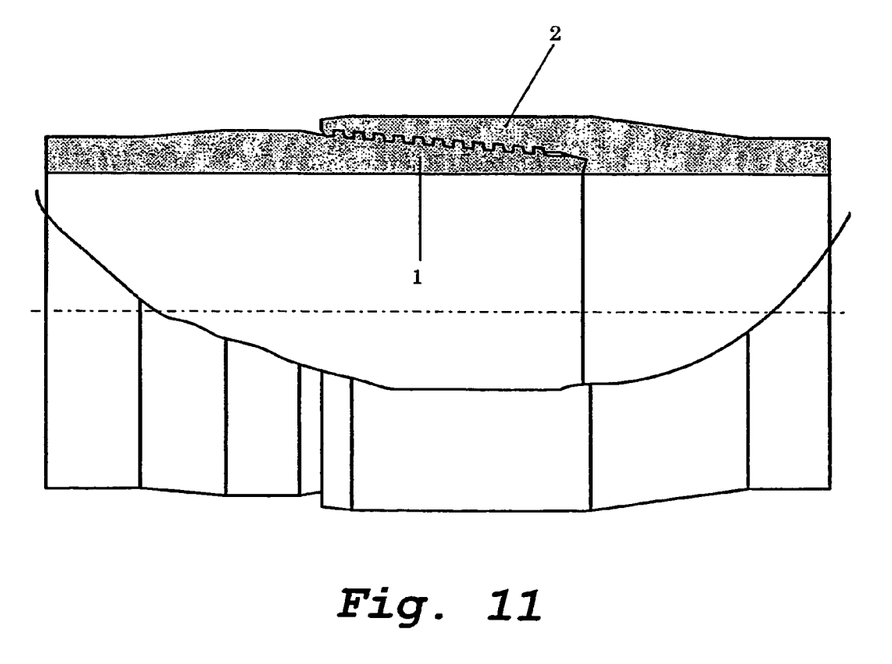
FIG. 11 is a schematic diagram illustrating an integral joint.

FIG. 11 is a schematic diagram illustrating an integral joint in which a pin member 1 and a box member 2 provided at respective end portions of pipe bodies directly engage with each other to form a threaded joint.

EXAMPLES

In order to clearly demonstrate the effects of the present invention, numerical simulation analysis by the elastoplastic finite element method was carried out for the specimens shown in Table 1.

The specimens shown in Table 1 were all coupling-type threaded joints for OCTG like that shown in FIG. 2 for use with 5½" 20# (lb/ft) steel pipes (outer diameter of 139.7 mm and wall thickness of 9.17 mm). The steel material used for all the specimens was that specified as P110 by API standards.

Figure 13:
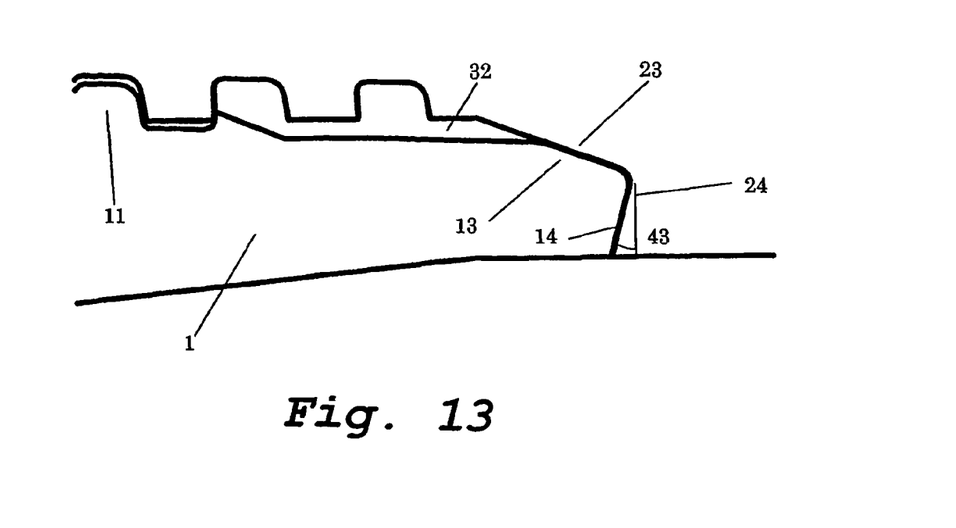
FIG. 13 is a schematic explanatory view of a conventional premium joint used as a comparative example.

Specimen B was a comparative example in the form of a conventional premium joint. It had a pin lip shape like that shown in FIG. 13. In FIG. 13, reference numbers which are the same as those previously used indicate the same members.

Specimens C-O had basically the same joint structure as for Specimen A except that the dimensions of the various portions were varied as shown in Table 1.

However, for Specimen J, the end of a pipe body having the above-described size was subjected to upsetting by external overlaying so that its outer diameter was increased to 148.4 mm, and as shown in FIG. 8, second shoulders each constituted by a flat surface perpendicular to the joint axis and having a thickness corresponding to the amount by which the pipe body was upset were provided on the end face of the box and on the corresponding pin.

Specimen L was another comparative example in which shoulder surfaces were provided on the end face of the box (instead of on the end face of the pin according to the present intention) and on the corresponding position of the pin.

The thread shape as defined in FIG. 3 was the same for all the specimens with respect to the taper (1/18), the thread height 74 (1.575 mm), the thread pitch (5.08 mm), and the load flank angle 71 (3 degrees). The axial gap 73 of stabbing flanks and the stabbing flank angle 72 were varied and are shown in Table 1 along with the other dimensions of the joint including the lip thickness ratio (the ratio of the lip thickness 41 to the pipe wall thickness, wherein the lip thickness was measured at the center of the contact seal portion 50), the length of the nose portion (nose length) 45, the taper of the sealing surfaces (seal taper) 44, the axial length of the seal contact portion (seal length) 50, the shoulder angle 43, the chamfer angles of the pin and box shoulders, 46 and 47, the presence or absence of the circumferential groove 32, and the distance between the thread and the sealing surface of the pin (in terms of thread pitch) (see FIGS. 5 and 6).

In the finite element analysis, the material was modeled as an elastoplastic material with isotropic hardening and having an elastic modulus of 210 GPa and a nominal yield strength in the form of a 0.2% offset yield strength of 110 ksi (758 MPa).

Make-up was performed for each specimen by contacting the shoulder surfaces of the pin and the box and then carrying out an additional $1.5/100$ turns of rotation.

In a first analysis, a compressive load (2852 kN) corresponding to 100% of the yield strength of the pipe body was applied to each made-up specimen, and the resistance to compression was evaluated based on the residual torque ratio defined as the value of the maintained torque remaining after removing the load (corresponding to the break-out torque which is the untightening torque of the connection after loading) divided by the make-up torque. (The larger the ratio, the less loosening of the joint has taken place. A value of at least 40% is considered necessary).

In a second analysis, the load sequence shown in FIG. 12 and Table 2 was applied to each made-up specimen. The sealability with respect to external pressure was evaluated by comparing the minimum values of the average seal contact pressure in the sequence. (The larger the value, the better the sealability).

The results are shown in Table 3. From the results in Table 3, it can be seen that a threaded joint for steel pipes according to the present invention had a higher level of torque resistance remaining and maintained a higher seal contact pressure than any of the comparative joints, and that it therefore had excellent resistance to compression and sealability with respect to external pressure.

Thus, according to the present invention, a threaded joint for steel pipes having excellent resistance to compression and sealability with respect to external pressure is obtained. At the same time, handling of the joint in the field can be made easier. Although the present invention has adequate performance even if processing such as swaging is not performed, if swaging is performed to increase the pin lip wall thickness, not only the resistance to compression and sealability with respect to external pressure but also the resistance to torsion can be still further improved. For special pipes such as pipes with an extremely large wall thickness, by additionally providing a second shoulder and/or metal-to-metal seal portion, a high level of resistance to compression, resistance to torsion, and/or sealability with respect to external pressure can be obtained.

Although the present invention has been described with respect to preferred embodiments, they are mere illustrative and not intended to limit the present invention. It should be understood by those skilled in the art that various modifications of the embodiments described above can be made without departing from the scope of the present invention as set forth in the claims.

TABLE 1

| Specimen | Lip thickness ratio* [%] | Nose length [mm] | Seal taper [°] | Axial length of seal [mm] | Shoulder angle [°] | Chamfer angle of pin shoulder [°] | Chamfer angle of box shoulder [°] | Groove of box | Distance between thread and seal of pin [pitch] | Gap of stabbing flanks [μm] | Stabbing flank angle [°] | Shoulder on the end of the pin |
|---|---|---|---|---|---|---|---|---|---|---|---|---|
| A | 63 | 8 | 11.3 | 3 | 0 | 15 | 165 | Apply | 0.4 | 60 | 10 | Yes |
| B | 46 | 0 | 20 | 3.3 | 15 | 0 | 180 | N/A | 1.7 | 100 | 10 | Yes |
| C | 63 | 2 | 11.3 | 3 | 0 | 15 | 165 | Apply | 0.4 | 60 | 10 | Yes |
| D | 63 | 8 | 30 | 3 | 0 | 15 | 165 | Apply | 0.4 | 60 | 10 | Yes |
| E | 56 | 8 | 11.3 | 3 | 0 | 15 | 165 | Apply | 0.4 | 60 | 10 | Yes |
| F | 63 | 8 | 11.3 | 3 | 20 | 15 | 165 | Apply | 0.4 | 60 | 10 | Yes |
| G | 63 | 8 | 11.3 | 3 | 0 | 6 | 174 | Apply | 0.4 | 60 | 10 | Yes |
| H | 63 | 8 | 11.3 | 3 | 0 | 15 | 165 | N/A | 0.4 | 60 | 10 | Yes |
| I | 63 | 8 | 11.3 | 3 | 0 | 15 | 165 | Apply | 0.4. | 60 | 45 | Yes |
| J | 63 | 8 | 11.3 | 3 | 0 | 15 | 165 | Apply | 0.4 | 60 | 10 | Yes |
| K | 63 | 8 | 11.3 | 3 | 0 | 6 | 174 | Apply | 0.4 | 160 | 45 | Yes |
| L | 23 | 8 | 11.3 | 3 | 0 | 15 | 165 | Apply | 0.4 | 60 | 10 | No |

TABLE 1-continued

| Specimen | Lip thickness ratio* [%] | Nose length [mm] | Seal taper [°] | Axial length of seal [mm] | Shoulder angle [°] | Chamfer angle of pin shoulder [°] | Chamfer angle of box shoulder [°] | Groove of box | Distance between thread and seal of pin [pitch] | Gap of stabbing flanks [µm] | Stabbing flank angle [°] | Shoulder on the end of the pin |
|---|---|---|---|---|---|---|---|---|---|---|---|---|
| M | 63 | 8 | 11.3 | 3 | 0 | 15 | 165 | Apply | 0.4 | 160 | 45 | Yes |
| N | 63 | 8 | 11.3 | 3 | 0 | 15 | 165 | Apply | 0.4 | 160 | 10 | Yes |
| O | 63 | 8 | 11.3 | 3 | 0 | 15 | 165 | Apply | 4 | 60 | 10 | Yes |

*The lip thickness ratio was the ratio of the lip thickness to the pipe wall thickness, wherein the lip thickness was the pin wall thickness at the center of the contact portion of the seal.

TABLE 2

| Loading Step | Loading Conditions | Size of load | |
|---|---|---|---|
| | | Axial load | External pressure |
| 1 | Make-up (1.5/100 turns from shouldering) | 0 KN | 0 MPa |
| 2 | 100% PBYS compression | −2852 kN | 0 MPa |
| 3 | 100% PBYS compression + 100% API external pressure | −2852 kN | 76.5 MPa |
| 4 | 100% API external pressure (compressive load removed) | 0 kN | 76.5 MPa |
| 5 | 67% PBYS tension + 100% API external pressure | 1911 kN | 44.1 MPa |
| 6 | 100% PBYS tension (external pressure removed) | 2852 kN | 0 MPa |

PBYS: Pipe Body Yield Strength, i.e., yield strength of the pipe body.
API: Collapse pressure (crushing external pressure) of the pipe body defined in API Specification 5C3.

TABLE 3

| Specimen | Maintained torque ratio (%) obtained in first analysis* | Minimum value of average seal contact pressure (MPa) obtained in second analysis |
|---|---|---|
| A | 74 | 301 |
| B | 33 | 23 |
| C | 68 | 151 |
| D | 62 | 226 |
| E | 59 | 233 |
| F | 49 | 203 |
| G | 61 | 242 |
| H | 71 | 253 |
| I | 48 | 287 |
| J | 78 | 315 |
| K | 58 | 236 |
| L | 28 | 36 |
| M | 63 | 211 |
| N | 58 | 233 |
| O | 43 | 108 |

*(maintained torque after removal of load)/(make-up torque)

The invention claimed is:

1. A threaded joint for steel pipes comprising a pin and a box,
the pin having a male thread, a metal sealing surface, and a shoulder surface,
the box having a female thread, a metal sealing surface, and a shoulder surface,
the male thread being interengaged with the female thread, the metal sealing surface of the pin radially interfering with the corresponding metal sealing surface of the box to form a metal to metal seal, and the shoulder surface of the pin being in axial abutment with the corresponding shoulder surface of the box, characterized in that
(i) the shoulder surface of the pin in axial abutment is provided at an end face of a nose portion of the pin,
(ii) the metal sealing surface of the pin is located on a pipe end side and between the male thread and the nose portion, a distance between a center of the metal sealing surface of the pin and an onset of the male thread is less than a distance between the center of the metal sealing surface of the pin and the shoulder surface of the pin, and wherein the nose portion extends from the metal sealing surface and to the end face, and further wherein an outside peripheral surface of said nose portion extending between the metal sealing surface and the end face does not contact the portion of the box facing the outside peripheral surface of the nose portion of the pin and the outside peripheral surface of the nose portion is not in prolongation of the metal sealing surface of the pin so that a thickness of the nose portion is increased over its length so that sealability with respect to external pressure and resistance to compression are improved; and further wherein a shape of the metal sealing surface of each of the pin and the box is independently selected from (i) a tapered surface resulting from rotation around a joint axis of a straight line inclined relative to the axis, wherein a taper of the metal sealing surface of the in is not less than 5 degrees, (ii) a bulged surface resulting from rotation around the joint axis of a curve, and a torical surface if the curve is a circular arc, and (iii) a torico-conical surface resulting from rotation around the joint axis of a combined line of said inclined straight line and said circular arc.

2. A threaded joint for steel pipes according to claim 1 characterized in that the nose portion has an outer surface which is cylindrical.

3. A threaded joint for steel pipes according to claim 1 characterized in that the axial length of the nose is between 4 mm and 20 mm for pipes having an outer diameter between 50 and 550 mm.

4. A threaded joint for steel pipes according to claim 1 characterized in that the threaded joint comprises means for allowing a portion of the male thread located adjacent to the metal sealing surface to escape from engaging with a female thread.

5. A threaded joint for steel pipes according to claim 4 characterized in that said means are a circumferential groove provided on the inner surface of the box between the female thread and the metal sealing surface of the box.

6. A threaded joint for steel pipes according to claim 5 characterized in that the axial length of the circumferential groove measured between the female thread and the metal sealing surface of the box is between 1.5 to 3.5 pitches of thread.

7. A threaded joint for steel pipes according to claim 1 characterized in that the metal sealing surface of the pin is located at a distance to the male thread which is no more than one pitch of thread.

8. A threaded joint for steel pipes according to claim 1 characterized in that the male and female threads are tapered threads and the male thread features a run-in portion where the envelope of the male thread roots has a reduced taper compared to that of the thread taper.

9. A threaded joint for steel pipes according to claim 8 characterized in that said envelope of the male thread roots in the run-in portion is a cylindrical surface.

10. A threaded joint for steel pipes according to claim 1 characterized in that the shoulder surfaces of the pin and the box are plane surfaces perpendicular to the joint axis.

11. A threaded joint for steel pipes according to claim 1 characterized in that the shoulder surfaces of the pin and the box are tapered and make an angle less than 16 degrees with the perpendicular to the joint axis so that the shoulder surface of the pin is hooked by that of the box.

12. A threaded joint for steel pipes according to claim 1 characterized in that the metal sealing surface of one of the pin and the box is a tapered surface while the metal sealing surface of the other one of the pin and the box is either a torical surface or a torico-conical surface, the tapered portion of the torico-conical metal sealing surface being on the nose side and having substantially the same taper than the tapered metal sealing surface.

13. A threaded joint for steel pipes according to claim 1 characterized in that the taper of a metal sealing surface is between 5 to 25 degrees.

14. A threaded joint for steel pipes according to claim 1 characterized in that the inner surface of the pin near the shoulder surface is chamfered so that the inner edge of the pin shoulder forms a circle which is concentric to the joint axis.

15. A threaded joint for steel pipes according to claim 1 characterized in that the inner surface of the box near the shoulder surface is chamfered.

16. A threaded joint for steel pipes according to claim 1 characterized in that the male thread and the female thread have each a generally trapezoidal shape which comprises a load flank, a stabbing flank, a thread root and a thread crest, the angle of the stabbing flanks with the normal to the joint axis being not less than 3 degrees and not more than 36 degrees.

17. A threaded joint for steel pipes according to claim 16 characterized in that there is a contact between the load flanks, and an axial gap between the stabbing flanks of the male and female threads when the threaded joint is made up is not less than 10 μm and not more than 150 μm.

18. A threaded joint for steel pipes according to claim 1 characterized in that the threaded joint for steel pipes further provides one or both of a second series of shoulder surfaces and a second series of metal sealing surfaces at an end portion of the box.

19. A threaded joint for steel pipes according to claim 1, wherein the metal sealing surface between the male thread and the shoulder surface of the pin forms a single and continuous seal with the sealing surface of the box.

20. A threaded joint for steel pipes comprising a pin and a box,
the pin having a male thread, a metal sealing surface, and a shoulder surface,
the box having a female thread, a metal sealing surface, and a shoulder surface,
the male thread being interengaged with the female thread,
the metal sealing surface of the pin radially interfering with the corresponding metal sealing surface of the box to form a metal to metal seal, and the shoulder surface of the pin being in axial abutment with the corresponding shoulder surface of the box, characterized in that
(i) the shoulder surface of the pin in axial abutment is provided at an end face of a nose portion of the pin,
(ii) the metal sealing surface of the pin is located on a pipe end side and between the male thread and the nose portion, a distance between a center of the metal sealing surface of the pin and an onset of the male thread is less than a distance between the center of the metal sealing surface of the pin and the shoulder surface of the pin, and
wherein the nose portion extends from the metal sealing surface and to the end face, and further wherein an outside peripheral surface of said nose portion extending between the sealing surface and the end face does not contact the portion of the box facing the outside peripheral surface of the nose portion of the pin and the outside peripheral surface of the nose portion is not in prolongation of the metal sealing surface of the pin so that a thickness of the nose portion is increased over its length so that sealability with respect to external pressure and resistance to compression are improved,
characterized in that the metal sealing surface of the pin is disposed radially inwards, as measured from the axis of the pin, of (i) the tangent to the crest of the male thread and the tip of the pin, and (ii) an extension line of the root of the male thread and further characterized in that a shape of the metal sealing surface of each of the pin and the box is independently selected from (i) a tapered surface resulting from rotation around a joint axis of a straight line inclined relative to the axis, wherein a taper of the metal sealing surface of the in is not less than 5 degrees, (ii) a bulged surface resulting from rotation around the joint axis of a curve, and a torical surface if the curve is a circular arc, and (iii) a torico-conical surface resulting from rotation around the joint axis of a combined line of said inclined straight line and said circular arc.

21. A threaded joint for steel pipes comprising a pin and a box,
the pin having a male thread, a metal sealing surface, and a primary shoulder surface,
the box having a female thread, a metal sealing surface, and a shoulder surface,
the male thread being interengaged with the female thread,
the metal sealing surface of the pin radially interfering with the corresponding metal sealing surface of the box to form a metal to metal seal, and the primary shoulder surface of the pin being in axial abutment with the corresponding shoulder surface of the box, characterized in that
(i) the primary shoulder surface of the pin in axial abutment is provided at an end face of a nose portion of the pin,
(ii) the metal sealing surface of the pin is located on a pipe end side and between the male thread and the nose portion, a distance between a center of the metal sealing surface of the pin and an onset of the male thread is less than a distance between the center of the metal sealing surface of the pin and the primary shoulder surface, and
wherein the nose portion extends from the metal sealing surface and to the end face, and further wherein an outside peripheral surface of said nose portion extending between the metal sealing surface and the end face does not contact the portion of the box facing the outside peripheral surface of the nose portion of the pin and the outside peripheral surface of the nose portion is not in prolongation of the metal sealing surface of the pin so that a thickness of the nose portion is increased over its length so that sealability with respect to external pressure and resistance to compression are improved; and
further wherein a shape of the metal sealing surface of each of the pin and the box is independently selected from (i)

a tapered surface resulting from rotation around a joint axis of a straight line inclined relative to the axis, wherein a taper of the metal sealing surface of the pin is not less than 5 degrees (ii) a bulged surface resulting from rotation around the joint axis of a curve, and a torical surface if the curve is a circular arc, and (iii) a torico-conical surface resulting from rotation around the joint axis of a combined line of said inclined straight line and said circular arc.

* * * * *